United States Patent [19]

Williamson et al.

[11] Patent Number: 5,041,407

[45] Date of Patent: Aug. 20, 1991

[54] HIGH-TEMPERATURE THREE-WAY CATALYST FOR TREATING AUTOMOTIVE EXHAUST GASES

[75] Inventors: W. Burton Williamson, Broken Arrow; Douglas G. Linden; Jack C. Summers, II, both of Tulsa, all of Okla.

[73] Assignee: Allied-Signal Inc., Morris Township, Morris County, N.J.

[21] Appl. No.: 450,634

[22] Filed: Dec. 14, 1989

[51] Int. Cl.$^5$ .................. B01J 21/04; B01J 23/10; B01J 23/58

[52] U.S. Cl. .................. 502/303; 502/304; 423/213.5

[58] Field of Search .................. 502/303, 304; 423/213.5

[56] References Cited

U.S. PATENT DOCUMENTS

| | | | |
|---|---|---|---|
| 3,291,564 | 12/1966 | Kearby | 423/212 |
| 4,170,573 | 10/1979 | Ernest et al. | 502/303 |
| 4,294,726 | 10/1981 | Bozon et al. | 502/304 |
| 4,528,279 | 7/1985 | Suzuki et al. | 502/303 X |
| 4,738,947 | 4/1988 | Wan et al. | 502/304 |
| 4,791,091 | 12/1988 | Bricker et al. | 502/303 |
| 4,868,148 | 9/1989 | Henk et al. | 502/303 |

FOREIGN PATENT DOCUMENTS 305119A 3/1989 European Pat. Off. .
311812A 4/1989 European Pat. Off. .
63-302948 12/1988 Japan .

OTHER PUBLICATIONS

Kirk-Othmer, Encylopedia of Chemical Technology, Third Ed., vol. 2, pp. 225–233.

*Primary Examiner*—W. J. Shine
*Attorney, Agent, or Firm*—Harold N. Wells; Roger H. Criss; Mary Jo Ryther

[57] ABSTRACT

A three-way catalyst for use in treating automotive exhaust gases employs a delta alumina support which contains oxides of cerium plus barium and/or lanthanum, plus at least one Group VIII noble metal from the group consisting of platinum, palladium, rhodium, ruthenium and iridium.

11 Claims, 1 Drawing Sheet

1a
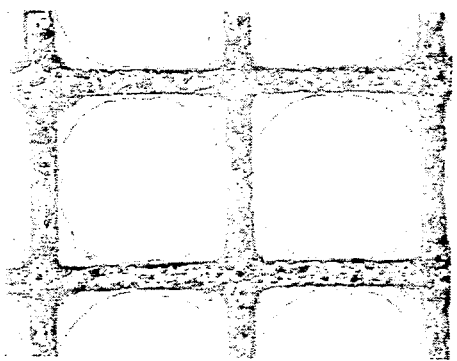
2a
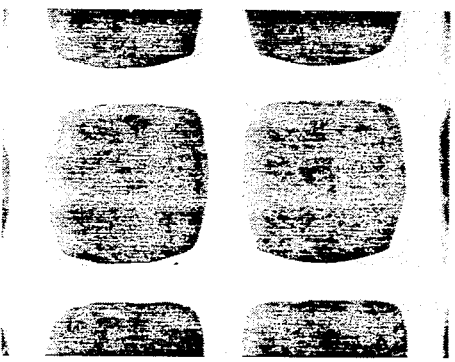
1b
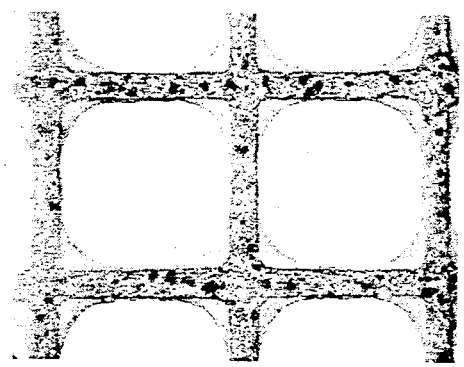
2b
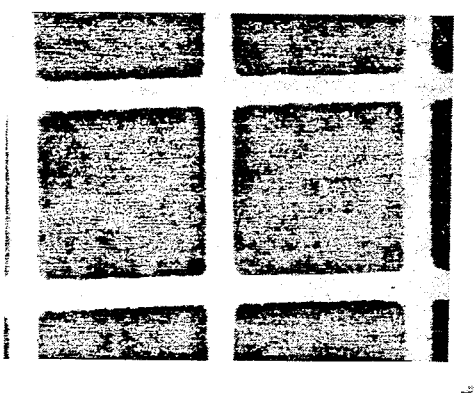

HIGH-TEMPERATURE THREE-WAY CATALYST FOR TREATING AUTOMOTIVE EXHAUST GASES

PRIOR ART

This invention relates generally to the application of catalysts to reduce the amount of hydrocarbons, carbon monoxide, and nitrogen oxides in automotive exhaust gases. Where a single catalyst is operated to simultaneously oxidize the hydrocarbons and carbon monoxide while reducing the nitrogen oxides, such a catalyst is called a "three-way" catalyst.

Much information is available regarding three-way catalysts. Such catalysts generally employ one or more noble metals such as platinum, palladium, and rhodium disposed on a support, which typically will be an alumina. Other metals and metal oxides are often included. The rare earths and in particular cerium and lanthanum are used to improve the performance of the catalysts. For example, U.S. Pat. No. 4,791,091 discloses such combinations of active metals. At times, many other promoters have been suggested, including barium as shown in recent European Patent Application EP-305119A.

The nature of the support has been given less attention in the art than the active metals and the methods of producing the catalysts. While many supports have been suggested, including alumina, zeolites, silica-alumina, silica, and others, alumina has generally been preferred. The selection of the specific type of alumina appears not to have been given much consideration. One early patent which considers such matters is U.S. Pat. No. 3,291,564 to Kearby. The patentee was concerned with stabilizing alumina supports for catalysts to be used in oxidizing hydrocarbons and carbon monoxide, rather than a three-way catalyst. Kearby suggests the use of barium, cesium, or potassium compounds to stabilize the alumina and to prevent the formation of theta or alpha aluminas, while retaining the desirable eta or gamma forms.

In a recent published Japanese Patent Application, 302,948/88, a catalyst for reducing nitrogen oxides and sulfur oxide with ammonia is described which employs base metals on theta and alpha aluminas produced by heating gamma and delta aluminas, said to deteriorate during exposure to sulfur oxide.

European Patent Application EP-311812A discloses a preference for alpha aluminas free of gamma and intermediate forms of alumina. Alpha aluminas are suggested to be stable up to 1200° C. even without stabilizers. Improved temperature resistance with satisfactory performance at low exhaust gas temperatures are said to result.

The present inventors have found that delta alumina is a particularly desirable form of alumina and that it responds in a different manner to addition of promoter elements than the more usual gamma alumina. Such catalysts have advantages over catalysts prepared using gamma alumina, especially when used at high temperatures, as will be seen below.

SUMMARY OF THE INVENTION

An improved three-way catalyst for treating automotive exhaust gases is comprised of a support comprising delta alumina on which is deposited effective amounts of the oxides of cerium plus barium and/or lanthanum along with an effective amount of at least one Group VIII noble metal from the group consisting of platinum, palladium, rhodium, ruthenium, and iridium. Superior results have been obtained with catalysts containing cerium and barium, cerium and lanthanum, and cerium plus both barium and lanthanum, when compared to similar catalysts on a gamma alumina support.

The alumina support typically will contain about 30-80 wt.% delta alumina.

Effective amounts of barium, cerium, and lanthanum will be used. Preferably, the amount of barium will be about 0.3 to 3 wt.%, the amount of cerium will be about 1.5 to 15 wt.%, and the amount of lanthanum will be about 1 to 10 wt.%, based on the total weight of the catalyst.

The amount of the Group VIII metals will be about 0.01 to 4 wt.%, preferably about 0.05 to 0.5 wt.%, based on the total amount of catalyst.

In another aspect, the invention resides in a process for treating automotive exhaust gases by contacting such gases with the three-way catalyst described above.

BRIEF DESCRIPTION OF THE DRAWINGS

FIG. 1(a) is a photograph showing the catalyst of the invention before high temperature aging.

FIG. 1(b) is a photograph showing the catalyst of the invention after high temperature aging.

FIG. 2(a) is a photograph showing a conventional catalyst before high temperature aging.

FIG. 2(b) is a photograph showing a conventional catalyst after high temperature aging.

DETAILED DESCRIPTION OF THE INVENTION

SUPPORT

With respect to the present invention the term "support" refers to the substrate on which the noble metals and promoters are deposited. This may be in pelleted form or more preferably will be in the form of a powdered material which is deposited on an inert structure (i.e. as a "washcoat"), such as a honeycomb monolith made of ceramics or metal, as will be familiar to those skilled in the art.

The support used in the present invention comprises a delta alumina, which is a structure obtained by calcination of aluminum trihydrate. The more usual aluminas are the gamma and eta forms which result from a lower temperature calcination. See, for example, the discussion in Kirk-Othmer, Encyclopedia of Chemical Technology, Third Ed., Vol. 2, pages 225-233. Delta aluminas are available commercially, for example, from Condea Chemie, LaRoche Chemical, and Vista Chemical. The amount of delta alumina present will depend upon the method of preparation. Preferably the alumina will contain about 30-80 wt.% delta alumina. For use as a washcoat with monoliths the alumina will have an average particle size in the range of about 1 μm to 50 μm. Such powdered aluminas will have noble metals and promoters deposited on them by methods to be described and then the powdered catalyst will be slurried in water and applied to the monolith by methods known to the art.

The same technique could be applied to an inert pellet. Alternatively, a particulate delta alumina could have deposited on it the catalytically active metals.

NOBLE METALS

The noble metal components will be those from Group VIII of the Periodic Table which are familiar to those skilled in the art, that is, platinum, palladium, rhodium, ruthenium, or iridium, particularly platinum, palladium, and rhodium, either alone or in combinations. Most particularly, the catalysts will be platinum-rhodium or palladium-rhodium mixtures. The amount of noble metals employed preferably will be about 0.01 to 4 wt.% based on the total weight of the catalyst, preferably about 0.05 to 0.5 wt.%.

The noble metals are applied to the delta alumina support by decomposing a noble metal compound which has been deposited on the support. Examples of such compounds include the following chloroplatinic acid, ammonium chloroplatinate, hydroxy disulfite platinum (II) acid, bromoplatinic acid, platinum tetrachloride hydrate, dinitrodiamino platinum, sodium tetranitroplatinate, rhodium trichloride, hexaamminerhodium chloride, rhodium carbonylchloride, rhodium trichloride hydrate, rhodium nitrate, sodium hexachlororhodate, sodium hexanitrorhodate, chloropalladic acid, palladium chloride, palladium nitrate, diamminepalladium hydroxide, tetraamminepalladium chloride, hexachloroiridate (IV) acid, hexachloroiridate (III) acid, dichlorodihydrooxoiridate (III) acid, ammonium hexachloroiridate (III), ammonium aquohexachloroiridate (IV), tetraamminedichloroiridate (III) chloride, and aquotetraammineiridate (III) chloride, ruthenium tetrachloride, hexachlororuthenate, and hexaammineruthenium chloride. Preferred compounds would be chloroplatinic acid, rhodium chloride, chloropalladic acid, hexachloroiridate (IV) acid, and hexachlororuthenate.

The noble metals may be applied separately or in combination, but typically they will be in a common solution which is used to impregnate the delta alumina, by techniques familiar to those skilled in the art.

PROMOTERS

The inventor has found that placing cerium, lanthanum, and barium compounds in the delta alumina provides benefits as compared with the more conventional gamma alumina, as will be seen below. Although each of these components has been suggested before, it now has been discovered that all these components together provide superior performance compared to any one individually or any two in combination. This appears to be opposite to the response found with gamma alumina as will be shown. In addition, it will be seen in the examples below that catalysts containing cerium and barium or cerium and lanthanum are also superior to similar catalysts using a conventional gamma alumina support In general, effective amounts of the promoters will be used, which may vary considerably. Preferably, the amount of barium will be about 0.3 to 3 wt.%, the amount of cerium will be about 1.5 to 15 wt.%, and the amount of lanthanum will be about 1 to 10 wt.% based on the total weight of the catalyst.

These promoter elements will be applied as decomposable compounds, usually in an aqueous solution, by methods familiar to those skilled in the art. Examples of such compounds include the halides, nitrates, and acetates, preferably the acetates. After calcining at a temperature of about 400° C. to about 700° C. for about 1 to 3 hours, the promoter elements will be present as their metal oxides.

CATALYST PREPARATION

Catalysts of the invention may be prepared by methods known to those skilled in the art and have in common the use of delta alumina as the support for noble metals and promoters.

The delta alumina will be reduced to a suitable size, by milling as required to provide particles of about 1 $\mu$m to 50 $\mu$m and then dried at a temperature of about 100° C. to 600° C. to produce a powder suitable for washcoating a relatively non-porous substrate. Following this step the powder may be slurried in water or other suitable liquid and the substrate immersed, sprayed, or otherwise covered with the slurry. Upon drying, the substrate is then ready to receive the active catalytic metals and promoters.

Alternatively, the delta alumina powder may be impregnated or otherwise have the active catalytic metals and promoters deposited before the slurry is made up and the substrate coated.

In either case, the noble metals and promoters may be applied to the delta alumina powder by methods familiar in the art. In particular, it is preferred to apply them by co-impregnation. The order of application of these metals is not believed to be an essential aspect of the invention.

EXAMPLE 1

Two series of catalysts were prepared in which gamma alumina (G) and delta alumina (D) were used as supports for the oxides of cerium, barium, and lanthanum. The supports were then applied in a slurry as washcoats to a monolith carrier and then the coated monolith was impregnated with noble metal solutions.

A powdered delta alumina (Condea Puralox SCFA-90) was mixed with cerium acetate, lanthanum acetate, and barium acetate in aqueous solutions to provide a $Al_2O_3$/Ce weight ratio of 4.04/1, a $Al_2O_3$/La weight ratio of 16.14/1, and a $Al_2O_3$/Ba weight ratio of 32.28/1. The mixture was dried and calcined at 538° C. for one hour. After cooling, the resulting powder was slurried in water with nitric acid and applied to a cordierite monolith supplied by Corning which had 62 square cells per centimeter. The volume of the test monolith was 1.518 L and the amount of the washcoat was 229 g/L. The cerium, lanthanum, and barium loadings were 42.4 g/L, 10.59 g/L, and 5.30 g/L respectively. The washcoated monolith was immersed in an aqueous solution of 0.3 wt.% $H_2PtCl_6$, 0.03 wt.% $RhC_3$, and 5 wt.% sugar. The resulting impregnated monolith contained 1.0 g/L Pt and 0.1 g/L Rh.

The process was repeated with the omission of barium so that the resulting monolith contained the same loadings of cerium and lanthanum but lacked barium. Then another monolith was prepared in a similar manner but omitting both lanthanum and barium. Three catalysts were obtained, designated $D_{Ce,La,Ba}$, $D_{Ce,La}$, and $D_{Ce}$ for performance testing.

Another series of catalysts was prepared in a similar manner using a gamma alumina (Rhone-Poulec SPH557). These catalysts had the same compositions as those described above and are designed $G_{Ce,La,Ba}$, $G_{Ce,La}$, and $G_{Ce}$.

EXAMPLE 2

The catalysts prepared in Example 1 were tested by exposing each sample to the exhaust gas from an engine operated at and near stoichiometric conditions with test conditions intended to provide accelerated aging of the catalysts.

A Ford 5 liter V-8 engine having throttle body fuel injection was operated for 60 seconds with a predetermined air-fuel ratio, followed by 5 seconds with no fuel so that the air-fuel ratio becomes very lean. The cycle was repeated for a total of 100 hours. The fuel was a commercial lead free premium fuel to which 15 mg Pb/gal and 2 mg P/gal and 50–150 wt. ppm of sulfur was added.

The performance of the catalysts was determined in another test using the exhaust gases from a Ford 5 liter V-8 engine. The hydrocarbon (HC), carbon monoxide (CO), and nitrogen oxides (NO) at the catalyst outlet were measured for a series of air-fuel weight ratios which traversed the stoichiometric and near-stoichiometric region from air-fuel ratios of 15/1 to 14/1. At each nominal value, the air-fuel ratio fluctuated ±0.4 units @ 1 Hz. The space velocity of the gases was about 30,000 $hr^{-1}$. The integral performance is reported at the conversion at air-fuel ratios of 14.71, 14.66, 14.61, 14.56, 14.51, 14.46, and 14.41. The performance at stoichiometric conditions is represented at an air-fuel ratio of 14.56, while an air-fuel ratio of 14.85 is slightly lean and an air-fuel ratio of 14.25 is slightly rich. The fuel used is indolene (Amoco unleaded) with traces of Pb and P and 50–150 wt. ppm of S. The nitrogen oxides at the inlet of the catalyst was controlled at 1800 wt. ppm ±50.

The "light-off" temperature was determined by continuously raising the temperature at the inlet of the catalyst over a range at which significant activity is normally experienced. When a predetermined percentage conversion is found, the temperature at the inlet is designated the light-off temperature, in these examples 50% conversion. A Ford 5 liter V-8 engine operated with a 14.56 A/F ratio (modulating ±0.4 units @ 1 Hz) supplied the exhaust gases, which were cooled to provide the desired temperature. A continuous traverse of a range of 200° C. up to 450° C. at 50°/min was used, followed by a descending traverse from 460° C. down to 200° C. at 63°/min. The fuel was indolene with trace amounts of Pb and P and 50–150 wt. ppm S. The results of the tests are summarized in the tables below.

TABLE 1a

| Washcoat Stabilizer: | | Gamma (G) Alumina Support | | |
|---|---|---|---|---|
| | | $G_{Ce-La-Ba}$ | $G_{Ce-La}$ | $G_{Ce}$ |
| | | % Conversion (450° C. Inlet) | | |
| Integral Performance | HC | 70 | 77 | 88 |
| (Stoich ± 0.15 A/F) | CO | 48 | 56 | 60 |
| | $NO_x$ | 53 | 60 | 68 |
| A/F = 14.85 | HC | 78 | 84 | 93 |
| | CO | 83 | 90 | 97 |
| | $NO_x$ | 28 | 29 | 35 |
| A/F = 14.56 | HC | 72 | 79 | 90 |
| | CO | 47 | 57 | 60 |
| | $NO_x$ | 54 | 61 | 68 |
| A/F = 14.25 | HC | 37 | 37 | 52 |
| | CO | 17 | 19 | 22 |
| | $NO_x$ | 59 | 61 | 81 |
| | | Temperature, °C. | | |
| Light-Off | HC | 413 | 409 | 394 |
| (50% Conversion) | CO | 430 | 413 | 394 |

TABLE 1b

| Washcoat Stabilizer: | | Delta (D) Alumina Support | | |
|---|---|---|---|---|
| | | $D_{Ce-La-Ba}$ | $D_{Ce-La}$ | $D_{Ce}$ |
| | | % Conversion (450° C. Inlet) | | |
| Integral Performance | HC | 86 | 82 | 66 |
| (Stoich ± 0.15 A/F) | CO | 60 | 56 | 46 |
| | NO | 68 | 64 | 51 |
| A/F = 14.85 | HC | 93 | 91 | 80 |
| | CO | 97 | 98 | 86 |
| | NO | 40 | 35 | 31 |

TABLE 1b-continued

| Washcoat Stabilizer: | | Delta (D) Alumina Support | | |
|---|---|---|---|---|
| | | $D_{Ce-La-Ba}$ | $D_{Ce-La}$ | $D_{Ce}$ |
| A/F = 14.56 | HC | 88 | 83 | 67 |
| | CO | 60 | 55 | 45 |
| | NO | 70 | 66 | 52 |
| A/F = 14.25 | HC | 50 | 45 | 41 |
| | CO | 22 | 21 | 20 |
| | NO | 73 | 66 | 61 |
| | | Temperature, °C. | | |
| Light-Off | HC | 414 | 413 | 409 |
| (50% Conversion) | CO | 414 | 412 | 401 |

Comparison of Tables 1a and 1b will show that with a gamma alumina support, ceria alone would be preferred over catalysts containing both ceria and lanthanum or those containing ceria, lanthanum, and barium. However, the reverse is true when the support is delta alumina. The catalyst containing all three promoters (Ce, La, Ba) on delta alumina provide superior results.

EXAMPLE 3

A catalyst prepared in a manner similar to those of Example 1 was tested in a high temperature cycling experiment versus a conventional catalyst employing gamma alumina as a support. The compositions of the catalysts were as follows:

| | Invention | Conventional |
|---|---|---|
| Noble Metal | 0.125 wt. % Pd | 0.125 wt. % Pd |
| Promoters | 1.1 wt. % Ba + 2.5 wt. % La + 8.3 wt. % Ce | 5% Ce |
| Support | 3.6 wt. % | 21% |
| Monolith | 64 wt. % | 79% |

The two samples were exposed to rapid cycling about 180 times each minute between heating and cooling periods typical of exposure of catalysts to high temperature exhaust gases such as are found in engine operation. For a total of 6 hours the samples were alternately heated by natural gas burners operating at 1340° C. and then cooled by a flow of room temperature air. While the catalysts had a similar appearance before testing, in 1080 heating and cooling cycles over 6 hours essentially all of the washcoat had disappeared from the conventional monolith, while the catalyst of the invention remained intact, having only some cracks in the washcoat which were considered to be insignificant. FIGS. 1a and 1b show the washcoat adhesion of a catalyst of the invention while FIGS. 2a and 2b show the poorer washcoat adhesion of the conventional catalyst.

EXAMPLE 4

Two catalysts were prepared which had similar compositions and differed mainly in the type of alumina used to prepare the washcoat applied to the monolith, a Corning honeycomb having 62 cells per square centimeter. Both catalysts had 0.862 g/L (of monolith) of Pt and 0.086 g/L Rh with 4.94 g/L Ni and 4.94 g/L Ce. The catalyst of the invention (A) also container 7.77 g/L Ba. The alumina used as a washcoat in catalyst A was delta alumina (Condea Chemie SCFA-90 which had been impregnated with cerium acetate $(Al_2)_3$/Ce=1.1/1) and calcined at 538° C. for 1 hour. The gamma alumina used for the comparative catalyst (B) was Versal 250 (LaRoche Chemical) impregnated with cerium acetate to provide an $Al_2O_3$/Ce wt. ratio of 3.95/1.

These catalysts were tested by exposing each sample to the exhaust gas from an engine operated at and near stoichiometric conditions with test conditions intended to provide accelerated aging of the catalysts under severe conditions.

A Chevrolet V-6 engine having closed loop control with throttle body fuel injection was operated in the following cycle: 40 seconds at a stoichiometric air-fuel ratio (14.5/1), 6 seconds rich air-fuel ratio (13.15/1), 10 seconds rich air-fuel ratio (13.15/1) with added air to increase air-fuel ratio at the catalyst inlet to 15.2/1 providing a temperature rise in the catalyst, and 4 seconds at stoichiometric air-fuel ratio (14.5/1 with added air to raise the air-fuel ratio to 17/1 at the catalyst inlet. This cycle was repeated for 100 hours using commercial lead free premium fuel containing 50–150 wt. ppm sulfur.

Thereafter, catalyst performance was evaluated in operation with the exhaust gases from a Ford 5 liter V-8 engine. A series of air-fuel ratios which traversed the stoichiometric and near-stoichiometric region from 15/1 to 14/1 were used, as described in Example 2. The results of the tests of the catalyst of the invention (A) and the comparison catalyst using a gamma alumina support (B) are given in the following table.

TABLE 2

| Catalyst alumina, stabilizers | | A<br>Delta, Ce, Ba | B<br>Gamma, Ce |
|---|---|---|---|
| | | % Conversion (450° C. inlet) | |
| Integral Performance | | | |
| (Stoich ± 0.15 A/F) | HC | 87.1 | 83.9 |
| | CO | 78.4 | 66.1 |
| | $NO_x$ | 80.7 | 70.6 |
| A/F = 14.85 | HC | 94.4 | 94.2 |
| | CO | 98.0 | 92.2 |
| | $NO_x$ | 48.5 | 45.5 |
| A/F = 14.55 | HC | 92.1 | 88.7 |
| | CO | 81.8 | 67.0 |
| | $NO_x$ | 82.9 | 71.4 |
| A/F = 14.25 | HC | 37.3 | 30.7 |
| | CO | 27.1 | 22.1 |
| | $NO_x$ | 76.9 | 59.5 |
| | | Temperature, °C. | |
| Light-Off | HC | 425 | 429 |
| (50% conversion) | CO | 424 | 426 |
| | $NO_x$ | 406 | 408 |

EXAMPLE 5

Two catalysts were prepared which had similar compositions and differed mainly in the type of alumina used to prepare the washcoat applied to the monolith to obtain a comparison as in Example 3. The monolith was an NGK honeycomb having 62 cells per square centimeter. Both catalysts had 1.18 g/L of Pt and 0.237 g/L of Rh. Catalyst C (invention) container 4.94 g/L of Ni and 4.94 g/L of Ce while Catalyst D (comparative) had 3.53 g/L Ni and 3.53 g/L Ce. Catalyst C contained 5.65 g/L Ba while Catalyst D contained 4.41 g/L. The alumina washcoat for Catalyst C was that used for Catalyst A of Example 3, while the alumina used for Catalyst D was similar to that of Catalyst B except that the $Al_2O_3$/Ce and ratio was 3.19/1.

The catalysts were first aged by the cycle described in Example 4 and then the catalysts were evaluated by the method described in Example 4. The results are given in the table below.

TABLE 3

| Catalyst Washcoat, stabilizers | | C<br>Delta, Ce, Ba | D<br>Gamma, Ce, Ba |
|---|---|---|---|
| | | % Conversion (450° C. inlet) | |
| Integral Performance @ A/F = 14.5 | | | |
| (A/F stoichiometric ± 0.15) | HC | 89.9 | 87.2 |
| | CO | 73.2 | 62.5 |
| | $NO_x$ | 77.4 | 69.7 |
| Conversion @ A/F = 14.85 | HC | 95.0 | 94.1 |
| | CO | 96.7 | 89.5 |
| | $NO_x$ | 46.1 | 43.8 |
| Conversion @ A/F = 14.55 | HC | 91.9 | 88.5 |
| | CO | 74.6 | 63.0 |
| | $NO_x$ | 77.4 | 69.0 |
| Conversion @ A/F = 14.25 | HC | 40.5 | 48.4 |
| | CO | 26.0 | 30.2 |
| | $NO_x$ | 69.1 | 83.0 |
| | | Temperature, °C. | |
| Light-off (50% Conversion) | HC | 399 | 402 |
| | CO | 398 | 400 |
| | $NO_x$ | 378 | 383 |

As Examples 4 and 5 show, the catalysts made with delta alumina (A and C) provided superior performance compared with those made with conventional gamma alumina (B and D).

We claim:

1. A three-way catalyst for use in treating automotive exhaust gases consisting essentially of:
    (a) an alumina support consisting substantially of delta-alumina;
    (b) effective amounts of the oxides of cerium plus barium deposited on the delta-alumina support of (a);
    (c) effective amounts of at least one Group VIII metal selected from the group consisting of platinum, palladium, rhodium, ruthenium, and iridium deposited on the support of (b).

2. The three-way catalyst of claim 1 further including lanthanum.

3. The three-way catalyst of claim 1 wherein the alumina support contains about 30–80 wt.% delta-alumina.

4. The three-way catalyst of claim 1 wherein the amount of barium is about 0.3 to 3 wt.%, the amount of cerium is about 1.5 to 15 wt.%, and the amount of lanthanum is about 1 to 10 wt.%, based on the total weight of the catalyst.

5. The three-way catalyst of claim 1 wherein the amount of the Group VIII metals is about 0.05 to 5 wt.% based on the total weight of the catalyst.

6. A three-way catalyst for use in treating automotive exhaust gases consisting essentially of:
    (a) an alumina support consisting substantially of delta-alumina;
    (b) effective amounts of the oxides of cerium and lanthanum deposited on the delta-alumina support of (a) wherein the atomic ratio of cerium to lanthanum is 4/1;
    (c) effective amounts of at least one Group VIII metal selected from the group consisting of platinum, palladium, rhodium, ruthenium, and iridium deposited on the support of (b).

7. The three-way catalyst of claim 2 wherein the alumina support contains about 30–80 wt.% delta alumina.

8. The three-way catalyst of claim 6 wherein the alumina support contains about 30–80 wt.% delta alumina.

9. The three-way catalyst of claim 6 wherein the amount of barium is about 0.3 to 3 wt.%, the amount of cerium is about 1.5 to 15 wt.%, and the amount of lanthanum is about 1 to 10 wt.% based on the total weight of catalyst.

10. The three-way catalyst of claim 2 wherein the amount of the Group VIII metals is about 0.05 to 5 wt.% based on the total weight of the catalyst.

11. The three-way catalyst of claim 6 wherein the amount of the Group VIII metals is about pb 0.05 to 5 wt.% based on the total weight of the catalyst.

* * * * *

UNITED STATES PATENT AND TRADEMARK OFFICE
CERTIFICATE OF CORRECTION

PATENT NO. : 5,041,407

DATED : Aug. 20, 1991

INVENTOR(S) : W. Burton Williamson, Douglas G. Linden and Jack C. Summers, II

It is certified that error appears in the above-identified patent and that said Letters Patent is hereby corrected as shown below:

olumn 4, line 41: "was 229" should read --was 22.9--;
         line 45: "$RhC_3$" should read --$RhCl_3$--.
olumn 5, line 16: "$hr^{31}$" should read --$hr^{-1}$--.
olumn 6, line 62: "container" should read --contained--.
olumn 8, line 64: "iridum" should read --iridium--.
olumn 10, line 7: delete "pb".

Signed and Sealed this

Ninth Day of February, 1993

Attest:

STEPHEN G. KUNIN

Attesting Officer      Acting Commissioner of Patents and Trademarks